United States Patent [19]
Giudicelli et al.

[11] 3,852,453
[45] Dec. 3, 1974

[54] METHOD OF ENHANCING VINCAMINE COMPOSITIONS

[75] Inventors: Don Pierre René Lucien Giudicelli, Fontenay-sous-Bois; Jean-Pierre René Gabriel, Tours, both of France

[73] Assignee: Synthelabo, Paris, France

[22] Filed: May 21, 1973

[21] Appl. No.: 362,239

[30] Foreign Application Priority Data
May 26, 1972 France .............................. 72.18880
June 21, 1972 France .............................. 72.22289
May 9, 1973 France .............................. 73.16633

[52] U.S. Cl. ................................ 424/262, 424/280
[51] Int. Cl. ............................................. A61k 27/00
[58] Field of Search ........................... 424/262, 280

[56] References Cited
FOREIGN PATENTS OR APPLICATIONS
2,035,784  12/1970  France .............................. 424/262
2,085,630  12/1971  France .............................. 424/262

OTHER PUBLICATIONS

Bilecan et al., Chem. Abtracts, Vol. 63, p. 922g (1965).

Oliver et al., Chem. Abtracts, Vol. 73, p. 7226u (1970).

Richter et al., Chem. Abtracts, Vol. 60, p. 14558d (1964).

*Primary Examiner*—Albert T. Meyers
*Assistant Examiner*—Norman A. Drezin
*Attorney, Agent, or Firm*—Armstrong, Nikaido & Wegner

[57] ABSTRACT

Pharmaceutical compositions containing a substance A having the eburnane structure, such as vincamine, and ascorbic acid or a derivative thereof.

3 Claims, No Drawings

3,852,453

METHOD OF ENHANCING VINCAMINE COMPOSITIONS

The present invention relates to new pharmaceutical compositions containing a natural or a synthetical substance A which has the eburnane structure.

Such substances are, for example, vincamine, vincaminol, vincanol, vincamone, vincaminic acid and amides or esters thereof, apovincaminic acid and amides or salts thereof, e.g., apovincamine; desoxyvincaminic acid and amides or salts thereof, e.g., desoxyvincamine; these compounds may be in the form of free base or in the form of addition salts or N-oxides.

These substances may be used in their different stereoisomeric forms for the preparation of the pharmaceutical compositions of the invention.

The Applicant has carried out experiments on the problem of the resorption of substances having the eburnane structure in the digestive system. In this connection, the applicant has studied the effect of numerous and varied compounds on the resorption of vincamine especially. More particularly the effect of the following compounds have been studied: saccharose, mannitol, sorbitol, penta-erythritol, inositol, d-glycosamine, sodium hexametaphosphate, disodium phosphate, trisodium phosphate, tartric acid, trisodium citrate, sodium benzoate, polysorbate 80, trihydromethylaminomethane (THAM), urethane, sodium dehydrocholate, ascorbic acid and its derivatives. The applicant also studied the effect on the resorption of the alkaloid of its salification by pharmaceutically acceptable mineral or organic acids (hydrochloric acid, 6,7-dihydroxy coumarin 4-methyl-sulfonic acid, etc.).

The experiments showed that the resorption of vincamine is improved by certain of the compounds tested, more particularly, by disodium phosphate, d-glycosamine, inositol, pentaerythritol, urethane, saccharose, sodium benzoate, and sometimes even when the vincamine is administered in the form of a mineral or organic acid salt. However, the effects observed are irregular and their strength is relatively low.

On the other hand, and quite unexpectedly, when ascorbic acid and its derivatives are used with vincamine or with a substance A having the eburnane structure, a very considerable increase in the resorption of the substance A is obtained in the digestive tract.

It is already known in the art to use ascorbic acid in pharmaceutical compounds having a vincamine base, but only as a preservative of solutes used for parenteral injections. In compounds of this nature, the amount of ascorbic acid required is very small and corresponds to approximately 10 percent by weight of the quantity of vincamine used.

According to the present invention, ascorbic acid increases the resorption of the ingested substance A in the digestive tract when it is administered together with the substance A, either in equimolecular amounts in the form of ascorbate of the substance A, or in non-equimolecular amounts in the form of a mixture.

In these combinations, the ascorbic acid may be present in the form of free acid or in the form of certain of its known derivatives (mineral or organic base salts, complexes formed, for example, with pyridinic bases, etc.) and the eburnane structural substance may either be present in base form, or in the form of salts of addition with pharmaceutically acceptable mineral or organic acids.

Of the ascorbic acid derivatives mentioned above, preferably either the equimolecular complex of ascorbic acid and nicotine-amide or the equimolecular complex of ascorbic acid and pyridoxine - the latter being considered both in its anhydrous form and in its monohydratic form - or the known salts which ascorbic acid forms with mineral or organic bases, etc., is/are used.

The proportions (expressed in weight of free active principles) between the substance A and ascorbic acid in the pharmaceutical compositions of the invention are from 4/1 to 1/200, more particularly from 2/1 to 1/5.

The experiments displaying the properties of the pharmaceutical compositions of the invention are described below.

a. Improvement in the resorption of vincamine.

The significances of the used symbols are the following:

vincamine base = $V$
vincamine hydrochloride = $V$ — HCl
salt of addition formed by 6,7-dihydroxy-coumarine-4-methylsulfonic acid and vincamine = LD 4298
free ascorbic acid = AA
equimolar complex of ascorbic acid and nicotinamide = NAA.

To show the improvement in the resorption of vincamine in the digestive tract, using AA or its derivatives, two tests were chosen, namely the increase in the plasma levels of vincamine after ingestion of an orally administered dose of the alkaloid, and the reduction of the $LD_{50}$ of the vincamine by oral route.

1/ The increase in vincamine plasma levels

Tests were carried out on Sherman rats of both sexes, weighing from 140–160 g and kept without food for 18 hours. The rats were divided into groups containing 4 to 6 animals.

Vincamine derivatives were administered by force feeding, in amounts equal to 300 mg of vincamine base per kilogram of body weight, and derivatives of ascorbic acid were added in amounts corresponding to 600 mg of free acid per kilogram of body weight; these two substances being ingested in dissolved or suspended form in distilled water in quantities of 1 ml per 100 g of the weight of the animal.

One hour or three and a half hours after administering the vincamine base or its salt, possibly associated with free ascorbic acid or one of its derivatives, a sample of blood was taken from the lower vena cava under mebubarbital anaesthesia. After extraction of the base by heptane, the plasmatic vincamine was estimated in the form of its hydrochloride by spectrophotometric dosage in the 219 m$\mu$ U.V. band.

The results are shown in tables I to X. Each table corresponds to a series of experiments carried out on the same day under the same conditions. All the figures relating to plasma levels represent the averages of the results obtained from a group of rats.

Accordingly, it will be noted that the combination of ascorbic acid and/or one of its derivatives with vincamine or one of its addition salts increases the plasmatic level of the alkaloid by 2 to 25 times. These results are highly significant, as is shown by the series of results evaluated in paired series (Ranking Method of Frank Wilcoxon, Individual Comparisons by Ranking Method, Biometric Bull., 1945, 1, p. 80–82).

The experimental procedure was the same as described above. The blood samples were taken after an hour. The results are tabulated in table XI. Each figure represents the average of a group of 4 to 6 animals. The figures in each horizontal line correspond to tests carried out on the same day and under the same conditions and the figures in each column correspond to tests carried out on different dates over about one month.

Statistical calculus shows that the differences are significant between $V$ and $v$—HCl ($p=0.02$ in favour of $V$—HCl), between $V$ and $V$+AA ($p=0.01$ in favour of $V$+AA), and between $V$—HCl and $V$+AA ($p=0.01$ in favour of $V$+AA).

TABLE I

Blood sample after one hour

| compounds | vincamine plasma level ($\mu$g/ml) |
|---|---|
| V | 2.4 |
| V + AA | 58.7 |

TABLE II

Blood sample after one hour

| compounds | vincamine plasma level ($\mu$g/ml) |
|---|---|
| V | 1.6 |
| V + AA | 13.6 |
| V—HCl | 3.9 |

TABLE III

Blood sample after one hour

| compounds | vincamine plasma level ($\mu$g/ml) |
|---|---|
| LD 4298 | 0.8 |
| LD 4298 + AA | 3.3 |

TABLE IV

Blood sample after one hour

| compounds | vincamine plasma level ($\mu$g/ml) |
|---|---|
| V—HCl | 5.4 |
| V—HCl + NAA | 11.3 |

TABLE V

Blood sample after one hour

| compounds | vincamine plasma level ($\mu$g/ml) |
|---|---|
| V—HCl | 5.4 |
| V—HCl + AA | 16 |

TABLE VI

Blood sample after one hour

| compounds | vincamine plasma level ($\mu$g/ml) |
|---|---|
| V | 1.8 |
| V + NAA | 8.6 |

TABLE VII

Blood sample after 3 hrs. 30 mins

| compounds | vincamine plasma level ($\mu$g/ml) |
|---|---|
| V | 1.9 |
| V + NAA | 10.7 |

TABLE VIII

Blood sample after 3 hrs. 30 min.

| compounds | vincamine plasma level ($\mu$g/ml) |
|---|---|
| LD 4298 | 10.4 |
| LD 4298 + AA | 19.2 |
| V | 7.4 |
| V + AA | 35.3 |

TABLE IX

Blood sample after 3 hrs. 30 mins.

| compounds | vincamine plasma level ($\mu$g/ml) |
|---|---|
| V | 1.9 |
| V + NAA | 10.7 |

TABLE X

Blood sample after 3 hrs. 30 mins.

| compounds | vincamine plasma level ($\mu$g/ml) |
|---|---|
| LD 4298 | 0.5 |
| LD 4298 + NAA | 9.6 |
| LD 4298 + AA | 4.2 |

TABLE XI

Vincamine plasma level ($\mu$g/ml)

| After administration of V | After administration of V—HCl | After administration of V+AA |
|---|---|---|
| 3.3 | 1.5 | 19 |
| 2.4 | 2.7 | 58.7 |
| 1.6 | 3.9 | 13.6 |
| 0 | 2.8 | 34.1 |
| 2.3 | 8.8 | 13.6 |
| 1.7 | 42.3 | 49.8 |
| 1.1 | 17.4 | 21 |
| 2.7 | 8.3 | 17 |
| Average 1.9 | 10.9 | 28.3 |

2/ Reduction in the $LD_{50}$ by oral administration and shortening of the time taken to die.

a. LD$_{50}$ by oral administration.

The LD$_{50}$ of V, V + AA 4298 and LD 4298 + AA was estimated on Sherman rats and Swiss mice of both sexes. The animals had been kept without food for 24 hours. The results are represented in tables XII and XIII. In this case, the difference is not significant between the LD$_{50}$ of LD 4298 + AA combined in the ratio 1:2 and of LD 4298 + AA combined in the ratio of 1:4, but it is highly significant between that of LD 4289 used alone and that of LD 4289 + AA combined in the ratio of 1:2 or in the ratio of 1:4. The difference between V and V + AA is significant ($p = 0.05$).

Thus, by reason of the improvement in the resorption of vincamine in the presence of ascorbic acid, it appears that the LD$_{50}$ of the alkaloid is reduced by ca. 50 percent when it is administered in combination with this acid.

b. Mortality delay in the course of determining the LD$_{50}$.

After taking fatal amounts of V or LD 4298, the mice died after periods from 15 minutes to 3 days. On the other hand, the mice died in 20 minutes to 1 hour when they were given V or LD 4298 combined with ascorbic acid.

These findings represent further proof of the increase and regulation of the digestive resorption of vincamine by ascorbic acid.

However, it is necessary to point out that the 50 percent reduction in the LD$_{50}$ of the vincamine when it is adminstered together with ascorbic acid is largely counterbalanced by the increase in the plasmatic level of the vincamine. As the latter is multiplied 2 to 25 times, the therapeutic index of the compounds according to the invention is at least equal, but often greatly improved with respect to that of the vincamine base.

TABLE XII (Rat)

* One part of V per 2 parts of AA

| compounds | LD$_{50}$ (g/kg) |
|---|---|
| V | 1.20 (0.91 – 1.58) |
| * V + AA | 0.660 (0.507 – 0.858) |

TABLE XIII (Mouse)

| compounds | dose ratio (by weight) LD 4298/AA | LD$_{50}$ (g/kg) |
|---|---|---|
| LD 4298 | — | 3.55 (2.54 – 4.97) |
| LD 4298 + AA | 1:2 | 1.8 (1.405 – 2,300) |
| LD 4293 + AA | 1:4 | 2.0 (1.63 – 2.45 | b. Improvement in the resorption of other substances A.

In table XIV are tabulated results obtained on Swiss mice of both sexes, kept without food for 24 hours. These results show reducing of the LD$_{50}$ of different substances which have eburnane structure when they are associated with ascorbic acid. The ratio between the substance and the ascorbic acid was one part by weight to two parts by weight.

The reduction in the LD$_{50}$ shows the increase and regulation of the digestive resorption of the substances A. The plasmatic level in the active substances is increased by addition of ascorbic acid.

The therapeutic index is increased in most cases. Consequently, it is possible for obtaining the same therapeutic effect to use a weaker dosage than the one which is usually used or to obtain a greater therapeutic effect with an identical dosage of the active principle.

TABLE XIV

| Compound | without ascorbic acid | | with ascorbic acid | |
|---|---|---|---|---|
| | administration in the form of | LD$_{50}$ (mg/kg) | administration in the form of | LD$_{50}$ (mg/kg) |
| Apovincamine | suspension | >2000 | solution-suspension | 750 |
| Desoxyvincamine | suspension | 230 | solution | 170 |
| Vincamone | suspension | 3000 | solution | 310 |
| Vincaminol | suspension | 850 | solution | 550 |
| Vincanol | solution-suspension | 400 | solution | 275 |
| Ethylvincaminate | suspension | >4000 | solution | 1200 |
| Ethylapovincaminate | solution-suspension | 1750 | solution | 1250 |
| Methyl-cyclopropylapovincaminate | suspension | 1500 | solution | 1170 |
| -N-oxide of ethyl vincaminate | suspension | >4000 | solution | 800 |

The above results show that the combination of ascorbic acid and/or its derivatives with substances A having the eburnane structure and their salts provides medicaments intended for oral administration, which may be used in human and veterinary medicine.

The pharmaceutical compositions of the invention are vasodilatating agents. They may be used for the treatment of circulation troubles.

The therapeutic field of the pharmaceutical composition of the invention is the one of the vincamine which is a cerebral oxygenator and vasoregulator (see the Merck Index, 8th edition, page 1,107).

They may be used for the treatment of cerebral deficiencies, severe cerebrovascular injuries, after-effects of cranial traumatisms and vascular affections in ophtalmology and otorhino-laringology.

The pharmaceutical compositions of the invention are administered by oral route, in the form of tablets which may be coated, sugar-coated pills, capsules pills, solutes or drinkable suspensions, etc.

A tablet or a pill may contain from 5 to 50 mg of the substance having the eburnane structure (in the form of the base) or an equivalent amount of the salt of the substance and from 5 to 1,000 mg of ascorbic acid or an equivalent amount of one of its derivatives.

The pharmaceutical compositions may contain usual excipients.

The daily dosage may be from 5 to 100 mg in the substance having the eburnane structure (in the form of the base).

The daily amount may be administered in one or several times.

What we claim is:

1. In the method of providing an enhanced serum level of an orally administered vincamine compound selected from the group consisting of vincamine, vincaminol, vincanol, vincamone, vincaminic acid, apovincaminic acid, desoxyvincaminic acid, and the pharmaceutically acceptable salts, amides, esters and N-oxide forms thereof to a patient, the improvement which comprises orally administering to said patient a mixture of said vincamine compound and ascorbic acid or a pharmaceutically acceptable salt thereof, the ratio of said vincamine compound to said ascorbic acid being from about 2:1 to 1:5.

2. The method of claim 1 wherein said ratio is 1:2.

3. The method of claim 2, wherein said compound is vincamine.

* * * * *